United States Patent
Liang et al.

(10) Patent No.: US 11,162,020 B2
(45) Date of Patent: Nov. 2, 2021

(54) ADDITIVES TO MINIMIZE VISCOSITY REDUCTION FOR GUAR/BORATE SYSTEM UNDER HIGH PRESSURE

(71) Applicants: Aramco Services Company, Houston, TX (US); Saudi Arabian Oil Company, Dhahran (SA)

(72) Inventors: Feng Liang, Cypress, TX (US); Ghaithan Al-Muntasheri, Houston, TX (US); Abdulrahman F. Alharbi, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/126,436

(22) Filed: Dec. 18, 2020

(65) Prior Publication Data

US 2021/0102114 A1     Apr. 8, 2021

Related U.S. Application Data

(63) Continuation of application No. 16/858,486, filed on Apr. 24, 2020, now Pat. No. 10,899,957, which is a
(Continued)

(51) Int. Cl.
*C09K 8/68* (2006.01)
*C09K 8/90* (2006.01)
(Continued)

(52) U.S. Cl.
CPC .............. *C09K 8/685* (2013.01); *C09K 8/665* (2013.01); *C09K 8/845* (2013.01); *C09K 8/887* (2013.01);
(Continued)

(58) Field of Classification Search
None
See application file for complete search history.

(56) References Cited

U.S. PATENT DOCUMENTS

| | | | | |
|---|---|---|---|---|
| 5,304,620 A | * | 4/1994 | Holtmyer | ................ C09K 8/08 166/278 |
| 5,955,144 A | | 9/1999 | Sinclair et al. | |

(Continued)

FOREIGN PATENT DOCUMENTS

| | | |
|---|---|---|
| EP | 0528550 A2 | 2/1993 |
| WO | 2011077336 A2 | 6/2011 |

(Continued)

OTHER PUBLICATIONS

International Search Report and Written Opinion dated May 18, 2018 of related application PCT/US2018/020420.
(Continued)

*Primary Examiner* — John J Figueroa
(74) *Attorney, Agent, or Firm* — Bracewell LLP; Constance Gall Rhebergen

(57) ABSTRACT

A composition for use as a pressure-tolerant dual-crosslinker gel in a fracturing fluid that comprises polymer, the polymer operable to increase the viscosity of a fluid; boron-containing crosslinker, the boron-containing crosslinker operable to crosslink the polymer; and a transition metal oxide additive, the transition metal oxide additive operable to crosslink the polymer.

20 Claims, 5 Drawing Sheets

Related U.S. Application Data continuation of application No. 15/908,970, filed on Mar. 1, 2018, now Pat. No. 10,669,472.

(60) Provisional application No. 62/465,432, filed on Mar. 1, 2017.

(51) Int. Cl.
  *C09K 8/84* (2006.01)
  *C09K 8/88* (2006.01)
  *C09K 8/66* (2006.01)
  *C09K 8/80* (2006.01)

(52) U.S. Cl.
  CPC .............. *C09K 8/90* (2013.01); *C09K 8/80* (2013.01); *C09K 2208/10* (2013.01)

(56) References Cited

U.S. PATENT DOCUMENTS

| | | | |
|---|---|---|---|
| 6,605,570 B2 | 8/2003 | Miller et al. | |
| 8,822,386 B2 | 9/2014 | Quintero et al. | |
| 9,512,349 B2 | 12/2016 | Alwattari | |
| 2003/0220203 A1* | 11/2003 | Harris, Jr. | C08K 5/103 507/200 |
| 2008/0099207 A1 | 5/2008 | Venditto et al. | |
| 2008/0287325 A1* | 11/2008 | Thompson | C08L 101/14 507/273 |
| 2016/0032174 A1 | 2/2016 | Fuller et al. | |
| 2016/0115374 A1 | 4/2016 | Ido et al. | |
| 2016/0333257 A1 | 11/2016 | Smith et al. | |
| 2016/0355727 A1 | 12/2016 | Barati | |
| 2017/0122080 A1 | 5/2017 | Bertani | |

FOREIGN PATENT DOCUMENTS

| | | |
|---|---|---|
| WO | 2012116269 A2 | 8/2012 |
| WO | 2017023564 A1 | 2/2017 |

OTHER PUBLICATIONS

England, K. et al. "The Unexpected Rheological Behavior of Borate-Crosslinked Gels. Paper SPE 140400 Presented at SPE Hydraulic Fracturing Technology Conference, The Woodlands, Texas, USA, Jan. 24-26." (2011).

England, K. et al. "Viscosity influences of high pressure on borate crosslinked gels" SPE Deepwater Drilling and Completions Conference. Society of Petroleum Engineers, 2010. SPE 136187.

Hurnaus, T. et al. "Crosslinking of Guar and HPG Based Fracturing Fluids using $ZrO_2$ Nanoparticles." Paper SPE 173778 presented at the International Symposium on Oilfield Chemistry, The Woodlands, Texas, USA, Apr. 13-15, 2015. (pp. 1-15).

Jafry, H., et al. "Effect of Functionalized Nanomaterials on the Rheology of Borate Cross-linked Guar Gum" Industrial & Engineering Chemistry Research, 50 (6), pp. 3259-3264. (2011).

Lafitte, V., et al. "Nanomaterials in Fracturing Applications" Paper SPE 155533 presented at the International Oilfield Nanotechnology Conference, Noordwijk, The Netherlands, Jun. 12-14, 2012 (pp. 1-8).

Parris, M. D., et al. "Influence of pressure on boron cross-linked polymer gels." Macromolecules 41.21 (2008): 8181-8186.

\* cited by examiner

ADDITIVES TO MINIMIZE VISCOSITY REDUCTION FOR GUAR/BORATE SYSTEM UNDER HIGH PRESSURE

RELATED APPLICATIONS

This application is a continuation application of U.S. patent application Ser. No. 16/858,486 filed on Apr. 24, 2020, which is a continuation application of U.S. patent application Ser. No. 15/908,970 filed on Mar. 1, 2018, which is related and claims priority to U.S. Pat. App. No. 62/465,432 filed on Mar. 1, 2017. For purposes of United States patent practice, this application incorporates the contents of both the non-provisional application and provisional application by reference in their entirety.

TECHNICAL FIELD

Disclosed are compositions and methods related to hydraulic fracturing. Specifically, disclosed are compositions and methods for stabilizing guar/borate crosslinked gels.

BACKGROUND

Guar is a high molecular weight, water soluble galactomannan polysaccharide used in hydraulic fracturing processes. Like all hydraulic fracturing fluids, a guar-based fluid needs to maintain a sufficient viscosity to prevent proppant settling and to support transport of proppant into fractures. To achieve the required thickening of the fracturing fluid while minimizing the amount of guar, a crosslinking agent, such as borax can be used to crosslink guar molecules. These guar/borate crosslinked fluids can be pumped at pressures sufficient to crack the rock of the formation allowing penetration of the proppant and gel mixture into the fracture. Conventional guar/borate crosslinked fluids can be used in hydraulic fracturing processes at temperatures in the range from 100 deg F. (37.8 deg Celsius (deg C.)) to 300 deg F. (148.9 deg C.). However, the viscosity of guar/borate crosslinked fluids can show reversibility in response to a number of influences including mechanical shear, pH, and temperature. In addition, these fluids can lose viscosity under an increase in pressure. The viscosity of guar/borate crosslinked fluids can be reduced under pressure greater than 2500 psi due to the loss of some or all of the viscosity contributed by the crosslinkers. It is understood that the crosslinking between cis-hydroxyl groups and borate is reversed when the pressure is increased, thus causing the reduced viscosity. The reduction in viscosity can happen almost instantaneously after the pressure is increased.

One way to minimize the pressure response of the guar/borate crosslinked fluids is to use a high polymer loading of the base guar polymer. Another option to minimize the pressure response of the guar/borate crosslinked fluids is to use a high dose of crosslinkers. However, these options can result in an initial viscosity that causes excessive friction during pumping of the fracturing fluid and can result in a gel that cannot be broken after hydraulic fracturing is complete. Both of these options result in an increase in costs of the fracturing fluid.

SUMMARY

Disclosed are compositions and methods related to hydraulic fracturing. Specifically, disclosed are compositions and methods for stabilizing guar/borate crosslinked gels.

In a first aspect, a composition for forming a pressure-tolerant dual-crosslinker gel in a fracturing fluid is provided. The composition includes a polymer operable to increase the viscosity of the fracturing fluid, a boron-containing crosslinker, and a transition metal oxide additive, where both the boron-containing crosslinker and the transition metal oxide additive are operable to crosslink the polymer.

In certain aspects, the polymer is present in a concentration between 15 pounds per thousand gallons (pptg) and 100 pptg. In certain aspects, the polymer is selected from the group consisting of guar, guar-derivatives, polyvinyl alcohols, mannose, mannose-containing compounds, and combinations of the same. In certain aspects, the boron-containing crosslinker is present at a concentration between 0.002% by weight and 2% by weight of the fracturing fluid. In certain aspects, the boron-containing crosslinker is selected from the group consisting of boron salts, boric acid, and combinations of the same. In certain aspects, the boron-containing crosslinker is a boron salt selected from the group consisting of sodium borate, sodium pentaborate, sodium tetraborate, calcium borate, magnesium borate, and combinations of the same. In certain aspects, the transition metal oxide additive is present at a concentration between 0.0002 percent by weight (% by weight) and 2% by weight of fracturing fluid. In certain aspects, the transition metal oxide is selected from the group consisting of transition metal oxide nanoparticles, transition metal oxide nanoparticle dispersions, polymeric material-stabilized transition metal oxides, transition metal oxide nanoparticles with other metal nanoparticles, and metal-organic polyhedra including transition metal oxides. In certain aspects, the transition metal oxide additive comprises a transitional metal oxide nanoparticle selected from the group consisting of zirconium oxide nanoparticles, titanium oxide nanoparticles, cerium oxide nanoparticles, and combinations of the same. In certain aspects, the transition metal oxide additive comprises a zirconium oxide nanoparticle dispersion present at a concentration of 0.04% by weight of fracturing fluid. In certain aspects, the transition metal oxide additive comprises a titanium oxide nanoparticle dispersion present at a concentration of 0.12% by weight of fracturing fluid. In certain aspects, the transition metal oxide additive comprises a cerium oxide nanoparticle dispersion present at a concentration of 0.02% by weight of fracturing fluid. In certain aspects, the polymer includes guar, the boron-containing crosslinker includes sodium borate, and the transition metal oxide includes $CeO_2$ nanoparticles. In certain aspects, a diameter of the transition metal oxide additive is in the range between 5 nm and 100 nm.

In a second aspect, a composition of a pressure-tolerant fluid for use in a hydraulic fracturing process is provided. The composition includes a pressure-tolerant fluid. The pressure-tolerant fluid includes a pressure-tolerant dual-crosslinker gel and a fracturing fluid. The pressure-tolerant dual-crosslinker gel includes a polymer, a boron-containing crosslinker operable to crosslink the polymer, and a transition metal oxide additive operable to crosslink the polymer. The pressure-tolerant dual-crosslinker gel is operable to viscosity the fracturing fluid to produce the pressure-tolerant fluid.

In certain aspects, the pressure-tolerant fluid includes proppant. In certain aspects, the fracturing fluid is an aqueous based fracturing fluid.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

FIG. 1 provides a flow diagram of a modified Anton Parr Rheometer for introducing viscous fluid into the pressure cell.

DETAILED DESCRIPTION

Figure 1:
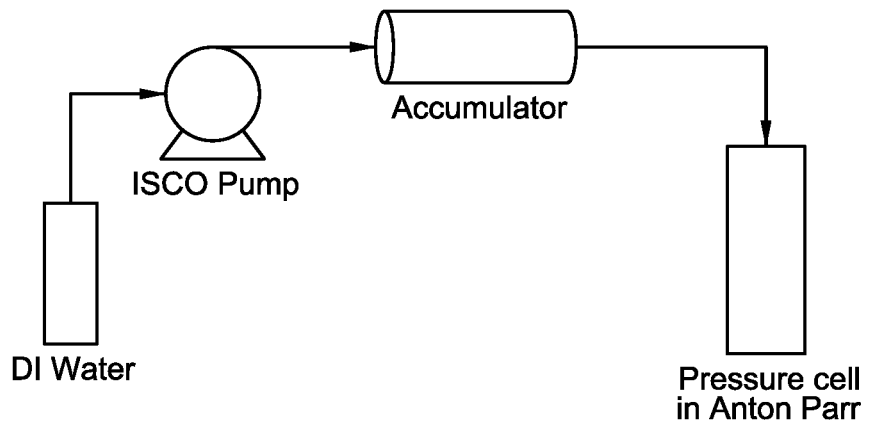

While the scope will be described with several embodiments, it is understood that one of ordinary skill in the relevant art will appreciate that many examples, variations and alterations to the apparatus and methods described here are within the scope. Accordingly, the embodiments described are set forth without any loss of generality, and without imposing limitations, on the embodiments. Those of skill in the art understand that the scope includes all possible combinations and uses of particular features described in the specification.

Described here are compositions and methods of pressure-tolerant dual-crosslinker gels that can be used in hydraulic fracturing processes. Advantageously, the pressure-tolerant dual-crosslinker gels exhibit reduced viscosity reversibility throughout the pressure range of a downhole environment. Advantageously, because the viscosity of the pressure-tolerant dual crosslinker gels is in a similar range of conventional polymer/borate systems, the friction pressure is not increased and therefore the same pumping systems that supply conventional guar/borate crosslinked fluids can be used to deliver the pressure-tolerant dual crosslinker gels.

As used throughout, "pressure-tolerant dual-crosslinker gel" refers to a gel produced by crosslinking of borate-crosslinkable polymers containing a boron-containing crosslinker and a transition metal oxide nanoparticle additive, such that the gel can experience viscosity fluctuations due to change in pressure, but is less sensitive to pressure changes than conventional polymer/borate systems in the absence of transition metal oxide nanoparticle additives.

As used throughout, "cis-hydroxyl groups" refers to compounds with a 1,2-diol in which the hydroxyl groups (—OH) are in a cis-geometry, such as for example in a cyclic sugar molecule such as mannose, or can form a cis-geometry when bonded to a boron or transition metal, such as for example polyvinyl alcohol.

As used throughout, "metal-organic polyhedra" refers to a hybrid class of solid-state crystalline materials constructed from the in-situ assembly of highly modular pre-designed molecular building blocks (MBBs) into discrete acrchitectures (0-D) containing a cluster of multi-valent metal nodes.

As used throughout, "in the absence" means the composition or method does not include, does not contain, is without.

As used throughout, "ligand" refers to an ion or molecule that binds to a central metal atom to form a coordination complex.

The pressure-tolerant dual-crosslinker gels can include a polymer, a boron-containing crosslinker, and a transition metal oxide additive. The pressure-tolerant dual-crosslinker gels can be mixed with a fracturing fluid to produce a pressure-tolerant fluid.

The polymer can be any water-soluble polymer that contains cis-hydroxyl groups. Examples of polymers that include cis-hydroxyl groups can include guar, guar-derivatives, polyvinyl alcohols, mannose, mannose-containing compounds, and combinations of the same. The pressure-tolerant dual-crosslinker gel can include an amount of polymer of between 12 pounds per thousand gallons (pptg) and 100 pptg. In at least one embodiment, the polymer is present at a concentration of 30 pptg. In at least one embodiment, the polymer is guar. The polymer can be provided as a powder, as a liquid blend, or a liquid slurry.

The boron-containing crosslinker can be any compound containing boron that can crosslink with cis-hydroxyl groups. Examples of boron-containing crosslinkers can include borate salts, boric acid, and combinations of the same. Examples of boron salts include sodium borate, sodium pentaborate, sodium tetraborate (borax), calcium borate, magnesium borate, and combinations of the same. In at least one embodiment, the boron-containing crosslinker is sodium borate. The pressure-tolerant dual-crosslinker gel can include an amount of boron-containing crosslinker between 0.002% to 2% by weight of the pressure-tolerant fluid. The boron-containing crosslinker can crosslink the polymer to form a gel.

The transition metal oxide additive is a water insoluble particulate compound. The transition metal oxide additive can be a metal oxide additive capable of crosslinking the polymer at pressures between 2,500 psi (17.24 MPa) and 15,000 psi (103.42 MPa). The transition metal oxide additive itself acts as the crosslinker and is in the absence of a separate crosslinker appended to its surface. Examples of transition metal oxide additives can include transition metal oxide nanoparticles, transition metal oxide nanoparticle suspensions, polymeric material-stabilized transition metal oxides, transition metal oxide nanoparticles with other metal nanoparticles, and metal-organic polyhedra including transition metal oxides.

Examples of transition metal oxide nanoparticles can include zirconium dioxide ($ZrO_2$) nanoparticles, titanium dioxide ($TiO_2$), cerium oxide ($CeO_2$) nanoparticles, and combinations of the same.

The transition metal oxide nanoparticle dispersion can include a transition metal oxide nanoparticle dispersed in an aqueous fluid. Examples of aqueous fluids can include water, glycol, ethers, and combinations of the same. Examples of transition metal oxide nanoparticle dispersions can include a $ZrO_2$ nanoparticle dispersion, a $TiO_2$ nanoparticle dispersion, a $CeO_2$ nanoparticle dispersion, and combinations of the same. In at least one embodiment, the transition metal oxide can be added as a transition metal oxide nanoparticle dispersion.

The polymeric material-stabilized transition metal oxide can include a polyvinylpyrrolidone (PVP)-stabilized transition metal oxide. Examples of PVP-stabilized transition metal oxides include PVP-stabilized $ZrO_2$ particles, PVP-stabilized $TiO_2$ particles, PVP-stabilized $CeO_2$ particles.

The transition metal oxide nanoparticles with other metal nanoparticles can include a mixture of the transition metal oxide nanoparticles and metal nanoparticles.

Examples of metal-organic polyhedra include metal-organic polyhedra including $ZrO_2$, metal-organic polyhedra including $TiO_2$, and metal-organic polyhedra including $CeO_2$.

The transition metal oxide additive can be nanoparticles with a diameter range of between 5 nanometers (nm) and 100 nm. The smaller the particle size the greater the surface area for a specific material. In at least one embodiment, the transition metal oxide additive has a diameter range of between 5 nm and 15 nm. In at least one embodiment, the transition metal oxide additive has a diameter range of between 30 nm and 50 nm. In at least one embodiment, the transition metal oxide additive has a diameter range of between 45 nm and 55 nm. In at least one embodiment, the transition metal oxide additive can include $ZrO_2$ nanoparticles, $TiO_2$ nanoparticles, $CeO_2$ nanoparticles and combinations of the same. In at least one embodiment, the transition metal oxide additive can be added as a dry additive, such as an aggregate of particles.

In at least one embodiment, the transition metal oxide additive can be added to a fracturing fluid at the well. The transition metal oxide additive can be present at concentrations between 0.0002% by weight and 2% by weight of the fracturing fluid. In at least one embodiment, the transition metal oxide additive is present at a concentration of 0.02% by weight of the fracturing fluid. In at least one embodiment, the transition metal oxide additive is present at a concentration of 0.04% by weight of the fracturing fluid. In at least one embodiment, the transition metal oxide additive is present at a concentration of 0.06% by weight of the fracturing fluid. In at least one embodiment, the transition metal oxide additive is present at a concentration of 0.08% by weight of the fracturing fluid. In at least one embodiment, the transition metal oxide additive is present at a concentration of 0.1% by weight of the fracturing fluid. In at least one embodiment, the transition metal oxide additive is present at a concentration of 0.12% by weight of the fracturing fluid.

The boron-containing crosslinker can crosslink the cis-hydroxyl groups of the polymer. In at least one embodiment, the cis-hydroxyl groups of the polymer begin to crosslink with the addition of the boron-containing crosslinker. In at least one embodiment, the ci-hydroxyl groups of the polymer begin to crosslinker when the triggering pressure of the pressure-tolerant fluid is reached. Borates of the boron-containing crosslinker can utilize boric acid ($B(OH)_3$) that can dissociate in water to yield the borate anion ($B(OH)_4^-$) and a hydrogen ion ($H^+$). The crosslinking reaction takes place between the borate anion and the cis-hydroxyl group on the polymer. The reaction between the borate anion and the cis-hydroxyl group occurs in 1 millisecond or less. It is understood that this short reaction time explains the fast viscosity recovery of borate-crosslinked gels when they are subjected to shear rate. It is understood that a nearly linear decrease of the borate signal stemming from borate with four attached organic groups indicates that B—O—C bonds are broken as a result of subjecting the borate/cis-hydroxyl groups to pressures greater than 2500 psi. This indicates that, to some extent, the process is reversed when the pressure is reduced to less than 2500 psi. Without being bound to a particular theory, it is believed that under high pressure, the boron-containing crosslinker was released from the cis-hydroxyl group of the polymer, while the transition metal oxide additive can step-in to crosslink with the free hydroxyl groups to maintain crosslinking of the polymer. In at least one embodiment, the transition metal oxide additive does not replace the crosslinks of the boron-containing crosslinker in a 1:1 ratio because the reactivity of boron and the cis-hydroxyl group is different than that of the polymer. In at least one embodiment, the pressure-tolerant dual-crosslinker gel is sensitive to pH because pH can impact the density of crosslinking in the pressure-tolerant dual-crosslinker gel, with greater pH resulting in greater density of crosslinking.

The fracturing fluid of the pressure-tolerant fluid can be any aqueous based fracturing fluid useful for hydraulic fracturing. The pressure-tolerant fluid can include a proppant. In at least one embodiment, the pressure-tolerant dual-crosslinker gel can be mixed with the fracturing fluid at the well site, such that the pressure-tolerant fluid is produced at the well site.

In at least one embodiment, at 8000 psi, the viscosity of the pressure-tolerant fluid (with 0.1% by weight transition metal oxide additive in the fracturing fluid) is five times greater than the viscosity of a fluid with a conventional polymer/borate system in the absence of a transition metal oxide additive.

The pressure-tolerant fluid can include other additives such as surfactants, biocides, clay stabilizers, breakers, and gel stabilizers. The pressure-tolerant dual-crosslinker gels are in the absence of boronic acid. The pressure-tolerant dual-crosslinker gels are in the absence of silica nanoparticles, including functionalized silica nanoparticles. In at least one embodiment, the pressure-tolerant dual-crosslinker gel is in the absence of additional additives.

In at least one embodiment, the pressure-tolerant dual-crosslinker gel includes guar, sodium borate, and $ZrO_2$ nanoparticles.

In at least one embodiment, the pressure-tolerant dual-crosslinker gel includes guar, sodium borate, and $TiO_2$ nanoparticles.

In at least one embodiment, the pressure-tolerant dual-crosslinker gel includes guar, sodium borate, and $CeO_2$ nanoparticles.

In at least one embodiment, the pressure-tolerant dual-crosslinker gel is in the absence of a chelating agent or chelating ligand. In at least one embodiment, the pressure-tolerant dual-crosslinker gel is in the absence of a transition metal complex, which is a water soluble complex where the transition metal is coordinated with ligands, which are different from the counter ions.

EXAMPLES

In the Examples, a number of experiments were run to test the properties of $ZrO_2$, $TiO_2$, and $CeO_2$ for use in a pressure-tolerant dual-crosslinker gel. Nanoparticle dispersions were obtained from US Research Nanomaterials, Inc. of Houston, Tex. The $ZrO_2$ nanoparticle dispersion (in an aqueous fluid at a concentration of 20 wt %, diameter in the range between 45-55 nm), $TiO_2$ nanoparticle dispersion (rutile, 15 wt %, diameter in the range between 5-15 nm), and $CeO_2$ nanoparticle dispersion (20 wt %, diameter in the range between 30-50 nm). Each nanoparticle dispersion was used as received without further treatment.

Steady-shear measurements were carried out on an MCR 102 Anton Parr rheometer equipped with a 1000 bar (100 MPa) pressure cell that was modified by adding a Teledyne ISCO of Lincoln, Nebr. pump and an accumulator, where the gel is placed prior to being injected into the pressure cell. FIG. 1 provides a flow diagram of the modified Anton Parr Rheometer for introducing viscous fluids into the pressure cell.

Example 1. In Example 1, a number of fluid samples were created to test the viscosity of $CeO_2$ containing compositions. The fluid samples were tested in the pressure cell by maintaining the pressure at 500 psi for 60 minutes, then increasing the pressure to 2,500 psi for 10 minutes, then increasing the pressure to 5,000 psi for 10 minutes, and finally increasing the pressure to 8,000 psi for 20 minutes. Then the pressure was decreased to 5,000 psi for 10 minutes, then decreased to 2,500 psi for 10 minutes, and finally decreased to 500 psi for 10 minutes. In the fluid samples of Example 1, the polymer was guar, the boron-containing crosslinker was PAXL-125L, a self-buffered borate crosslinker, obtained from Precision Additives, Houston, Tex., and transition metal oxide additive was the $CeO_2$ nanoparticle dispersion. Table 1 shows the composition of the fluids of Example 1.

TABLE 1

Composition of fluid samples of Example 1 with $CeO_2$ dispersion

| Fluid | Polymer Concentration | Boron-Containing Crosslinker Concentration | Transition Metal Oxide Additive ($CeO_2$) Concentration |
| --- | --- | --- | --- |
| 1A | 30 pptg | 1 gpt | 0% by weight |
| 1B | 30 pptg | 1 gpt | 0.02% by weight |
| 1C | 30 pptg | 1 gpt | 0.04% by weight |
| 1D | 30 pptg | 1 gpt | 0.08% by weight |

Figure 2:
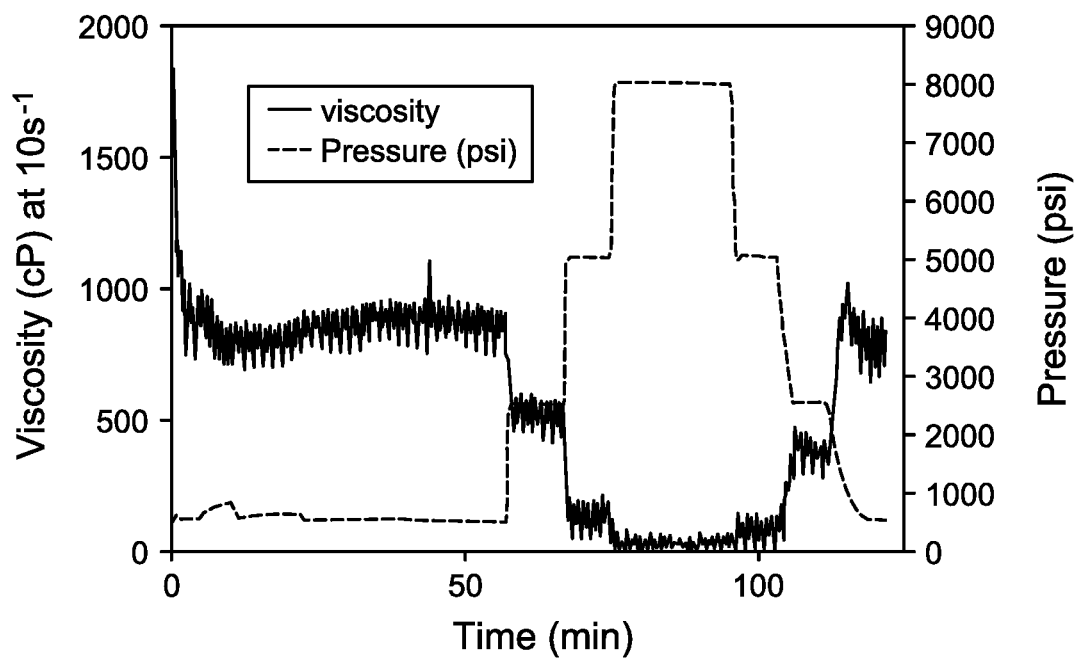
FIG. 2 shows the viscosity (in cP at a shear rate of 10 inverse seconds ($s^{-1}$)) response of the crosslinked 30 pptg guar/borate crosslinked fluid under pressure change at 150 deg F.

Fluid 1A was a guar/borate crosslinked fluid prepared by hydrating guar in Houston, Tex. tap water to produce a 30 pptg guar gel, which was then crosslinked with 1 gallon per thousand (gpt) PAXL-125L. The pH of the guar/borate crosslinked fluid was around 10. FIG. 2 shows the viscosity (in cP at a shear rate of 10 inverse seconds ($s^{-1}$)) response of the crosslinked 30 pptg guar/borate crosslinked fluid under pressure change at 150 deg F. As shown in FIG. 2, a rapid viscosity loss was observed with increasing pressure. The viscosity was reduced to 140 cP at 5,000 psi and further reduced to 27 cP at 8,000 psi, a 97% viscosity loss. The viscosity was subsequently regained when the pressure was removed as can be seen in Table 2.

Figure 3:
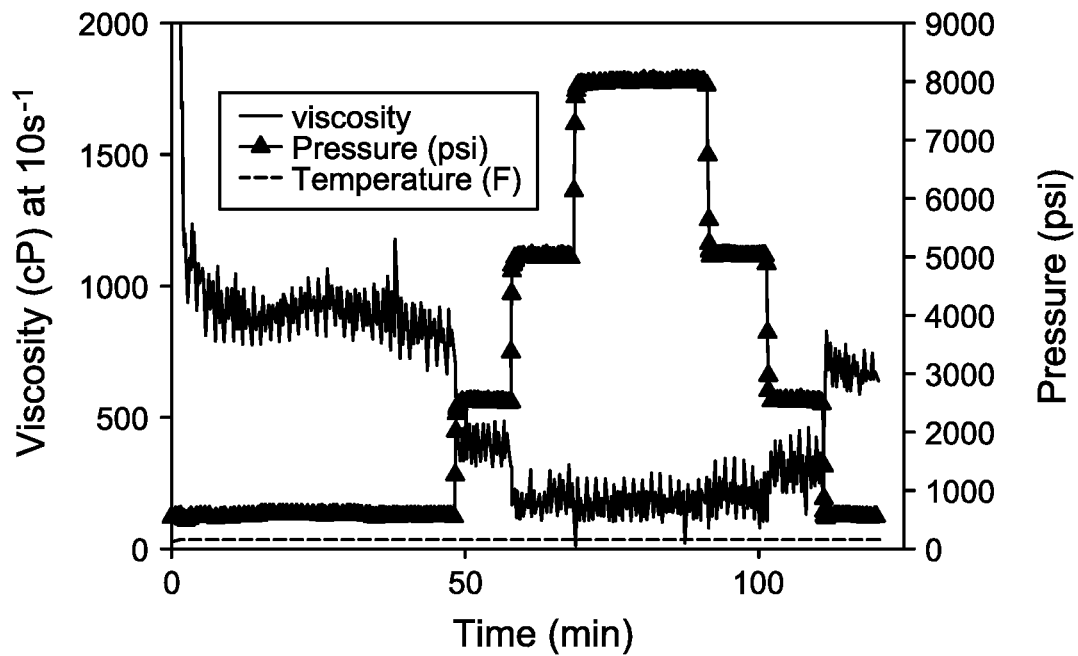
FIG. 3 shows the viscosity (in cP at shear rate of 10 $s^{-1}$) response of the pressure-tolerant dual-crosslinker gel with cerium oxide ($CeO_2$) nanoparticles under pressure change at 150 deg F.

Fluid 1B was a pressure-tolerant dual-crosslinker gel prepared by hydrating guar in Houston, Tex. tap water to produce a 30 pptg guar gel, mixing the guar gel with 0.02% by weight of the $CeO_2$ nanoparticle dispersion, and then mixed with 1 gpt PAXL-125L. The pH of Fluid 1B was about 10. FIG. 3 shows the viscosity (in cP at shear rate of 10 $s^{-1}$) response of the pressure-tolerant dual-crosslinker gel with $CeO_2$ nanoparticles under pressure change at 150 deg F. As shown in FIG. 3, the viscosity was reduced to about 180 cP at 5,000 psi and remained the same at 8,000 psi.

Figure 4:
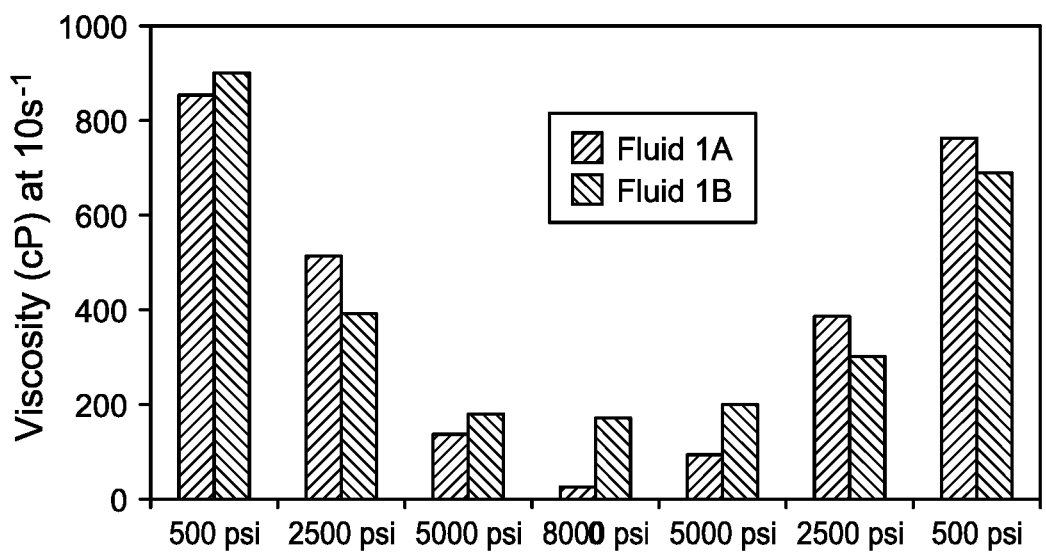
FIG. 4 shows a comparison of the viscosity response of Fluid 1A (with no nanoparticles) and Fluid 1B (with 0.02% by weight $CeO_2$ dispersion) of Example 1.

FIG. 4 shows a comparison of the viscosity response of Fluid 1A and Fluid 1B of Example 1. As can be seen, the pressure-tolerant dual-crosslinker gel undergoes less viscosity loss than the guar/borate crosslinked fluid. At 8,000 psi the viscosity of Fluid 1B was 170 cP, which was a six-fold increase over the viscosity of Fluid 1A as shown in Table 2.

TABLE 2

Data from viscosity tests for Fluid 1A, Fluid 1B, Fluid 1C, and Fluid 1D.

| | Viscosity (cP at 10 $s^{-1}$) | | | |
| --- | --- | --- | --- | --- |
| Pressure (psi) | Fluid 1A | Fluid 1B | Fluid 1C | Fluid 1D |
| 500 | 853 | 899 | 963 | 980 |
| 2500 | 514 | 390 | 445 | 352 |
| 5000 | 140 | 181 | 186 | 212 |
| 8000 | 27 | 170 | 154 | 177 |
| 5000 | 94 | 201 | 194 | 191 |
| 2500 | 388 | 304 | 268 | 256 |
| 500 | 764 | 688 | 615 | 535 |

Fluid 1C was a pressure-tolerant dual-crosslinker gel prepared by hydrating guar in Houston, Tex. tap water to produce a 30 pptg guar gel, mixing the guar gel with 0.04% by weight of the $CeO_2$ nanoparticle dispersion, and then mixed with 1 gpt PAXL-125L. The viscosity response of Fluid 1C was tested in the pressure cell at 10 $s^{-1}$ at 150 deg F.

Fluid 1D was a pressure-tolerant dual-crosslinker gel prepared by hydrating guar in Houston, Tex. tap water to produce a 30 pptg guar gel, mixing the guar gel with 0.08% by weight of the $CeO_2$ nanoparticle dispersion, and then mixed with 1 gpt PAXL-125L. The viscosity response of Fluid 1D was tested in the pressure cell at 10 $s^{-1}$ at 150 deg F.

Figure 5:
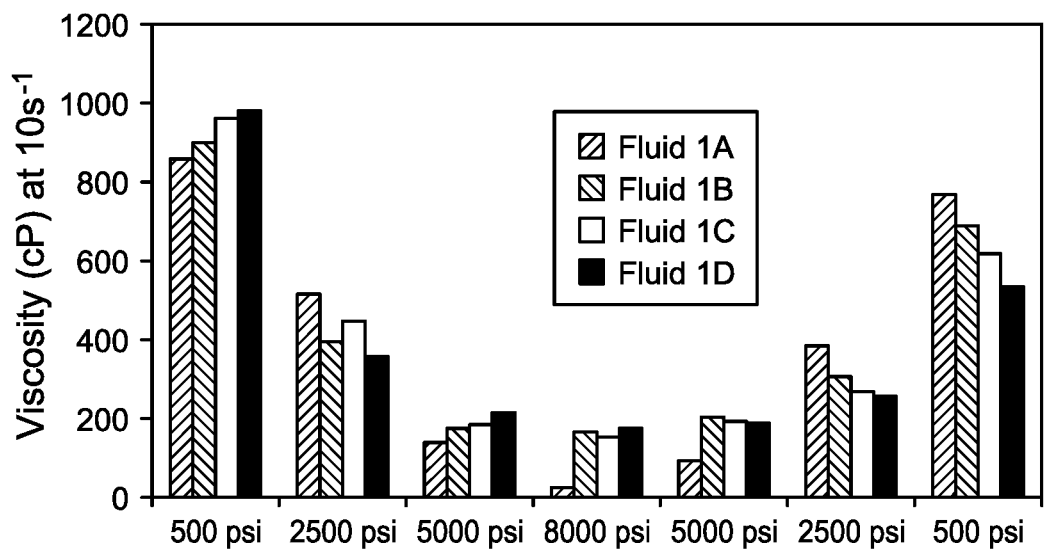
FIG. 5 shows a comparison of the viscosity response of Fluid 1A (with no nanoparticles), Fluid 1B (with 0.02% by weight $CeO_2$ dispersion), Fluid 1C (with 0.04% by weight $CeO_2$ dispersion) and Fluid 1D (with 0.08% by weight $CeO_2$ dispersion) of Example 1.

FIG. 5 shows a comparison of the viscosity response of Fluid 1A, Fluid 1B, Fluid 1C and Fluid 1D. As shown in FIG. 5, increased concentrations of cerium oxide continue to show improved viscosity at 8000 psi compared to the guar/borate crosslinked fluid of Fluid 1A. However, between the pressure-tolerant dual-crosslinker gels, the viscosities of Fluid 1B, Fluid 1C, and Fluid 1D at 8,000 psi were comparable. Based on the results, 0.02% by weight of $CeO_2$ can be effective at reducing viscosity loss due to pressure increase.

Figure 6:
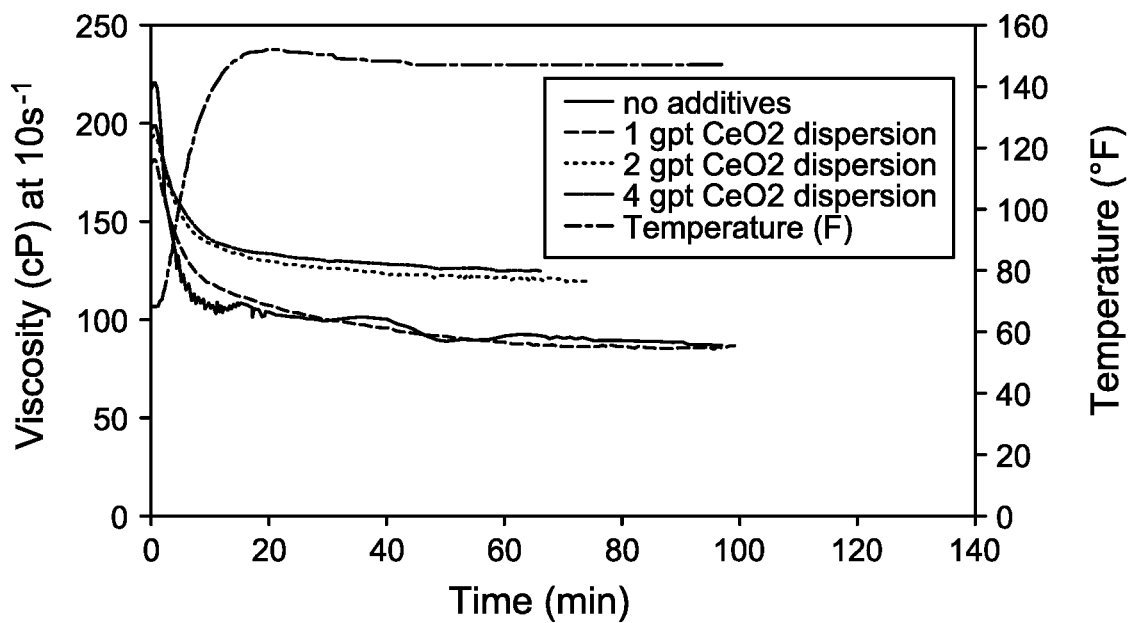
FIG. 6 shows a comparison of the viscosity curves of fluids with 30 pptg guar and $CeO_2$ dispersion in the absence of a boron-containing crosslinker.

FIG. 6 shows a comparison of the viscosity curves for different fluids at pH 10 containing guar and $CeO_2$ and in the absence of a boron-containing crosslinker. The figure shows that the fluid viscosity of 30 pptg guar with 0.02% by weight $CeO_2$ is about the same as the viscosity of a 30 pptg guar gel with no transition metal oxide additive or boron-containing crosslinker, that is no viscosity change is observed, suggesting minimal crosslinking is observed with 0.02% by weight $CeO_2$ addition for 30 pptg guar. With the addition of 0.04% by weight $CeO_2$ and 0.08% by weight $CeO_2$, a change in viscosity is observed, confirming that $CeO_2$ plays a role in crosslinking the guar of the pressure-tolerant dual-crosslinker gel.

Example 2. In Example 2, a number of fluids were created to test the viscosity of $ZrO_2$ containing compositions. The fluids were tested in the pressure cell of FIG. 1 by maintaining the pressure at 500 psi for 60 minutes, then increasing the pressure to 2,500 psi for 10 minutes, then increasing the pressure to 5,000 psi for 10 minutes, and finally increasing the pressure to 8,000 psi for 20 minutes. Then the pressure was decreased to 5,000 psi for 10 minutes, then decreased to 2,500 psi for 10 minutes, and finally decreased to 500 psi for 10 minutes. In the fluid samples of Example 2, the polymer was guar, the boron-containing crosslinker was sodium borate, and transition metal oxide additive was the $ZrO_2$ nanoparticle dispersion. Table 3 shows the composition of the fluids of Example 2.

TABLE 3

Composition of fluid samples of Example 2 with $ZrO_2$

| Fluid | Polymer Concentration | Boron-Containing Crosslinker Concentration | Transition Metal Oxide Additive ($ZrO_2$) Concentration |
|---|---|---|---|
| 2A | 30 pptg | 1 gpt | 0% by weight |
| 2B | 30 pptg | 1 gpt | 0.02% by weight |
| 2C | 30 pptg | 1 gpt | 0.04% by weight |

Fluid 2A was a guar/borate crosslinked fluid prepared by hydrating guar in Houston, Tex. tap water to produce a 30 pptg guar gel, which was then crosslinked with 1 gpt PAXL-125L. PAXL-125L is a self-buffered borate crosslinker. The pH of Fluid 2A was around 10. The viscosity response of Fluid 2A was tested in the pressure cell at 10 s$^{-1}$ at 150 deg F. as outlined.

Fluid 2B was a pressure-tolerant dual-crosslinker gel prepared by hydrating guar in Houston, Tex. tap water to produce a 30 pptg guar gel, mixing the guar gel with 0.02% by weight of the $ZrO_2$ nanoparticle dispersion, and then mixed with 1 gpt PAXL-125L. The pH of Fluid 2B was about 10. The viscosity response of Fluid 2B was tested in the pressure cell at 10 s$^{-1}$ at 150 deg F. as outlined.

Fluid 2C was a pressure-tolerant dual-crosslinker gel prepared by hydrating guar in Houston, Tex. tap water to produce a 30 pptg guar gel, mixing the guar gel with 0.04% by weight of the $ZrO_2$ nanoparticle dispersion, and then mixed with 1 gpt PAXL-125L. The pH of Fluid 2C was about 10. The viscosity response of Fluid 2C was tested in the pressure cell at 10 s$^{-1}$ at 150 deg F. as outlined.

Figure 7:
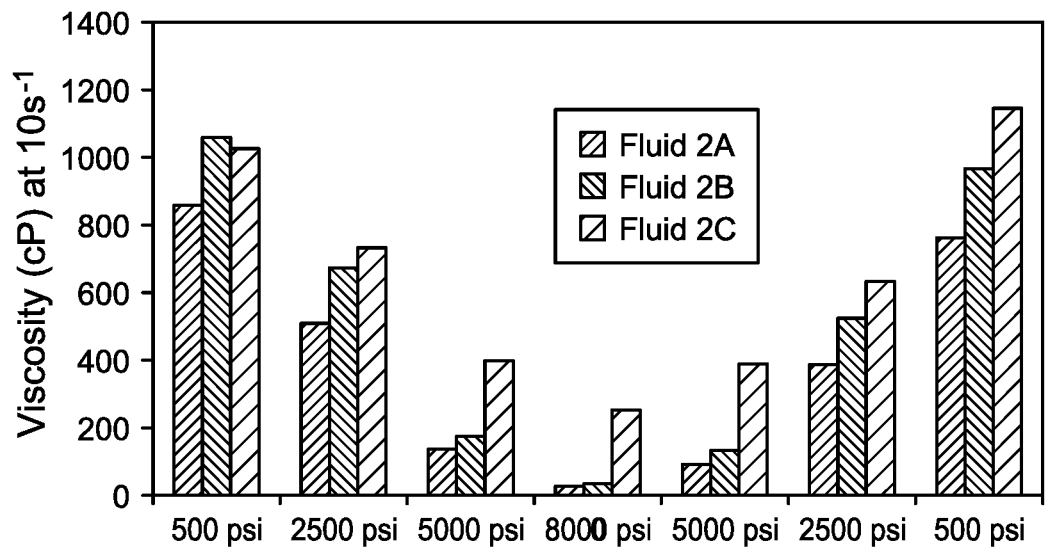
FIG. 7 shows a comparison of the viscosity response of Fluid 2A (no nanoparticles), Fluid 2B (with 0.02% by weight zirconium oxide ($ZrO_2$) dispersion), and Fluid 2C (with 4% by weight $ZrO_2$ dispersion) of Example 2.

FIG. 7 shows a comparison of the viscosity response of Fluid 2A, Fluid 2B, and Fluid 2C of Example 2. As shown in FIG. 7, with the addition of 0.04% by weight of the $ZrO_2$ nanoparticle dispersion (Fluid 2C) the viscosity was 253 cP at 10 s$^{-1}$ under 8,000 psi, compared to 27 cP for Fluid 2A, which was a nine-fold increase over the viscosity of Fluid 2A at 8,000 psi as shown in Table 4.

TABLE 4

Data from viscosity tests for Fluid 2A, Fluid 2B, and Fluid 2C.

| | Viscosity (cP at 10 s$^{-1}$) | | |
|---|---|---|---|
| Pressure (psi) | Fluid 2A | Fluid 2B | Fluid 2C |
| 500 | 853 | 1055 | 1023 |
| 2500 | 514 | 677 | 732 |
| 5000 | 140 | 173 | 402 |
| 8000 | 27 | 30 | 253 |
| 5000 | 94 | 130 | 395 |
| 2500 | 388 | 523 | 630 |
| 500 | 764 | 965 | 1147 |

Figure 8:
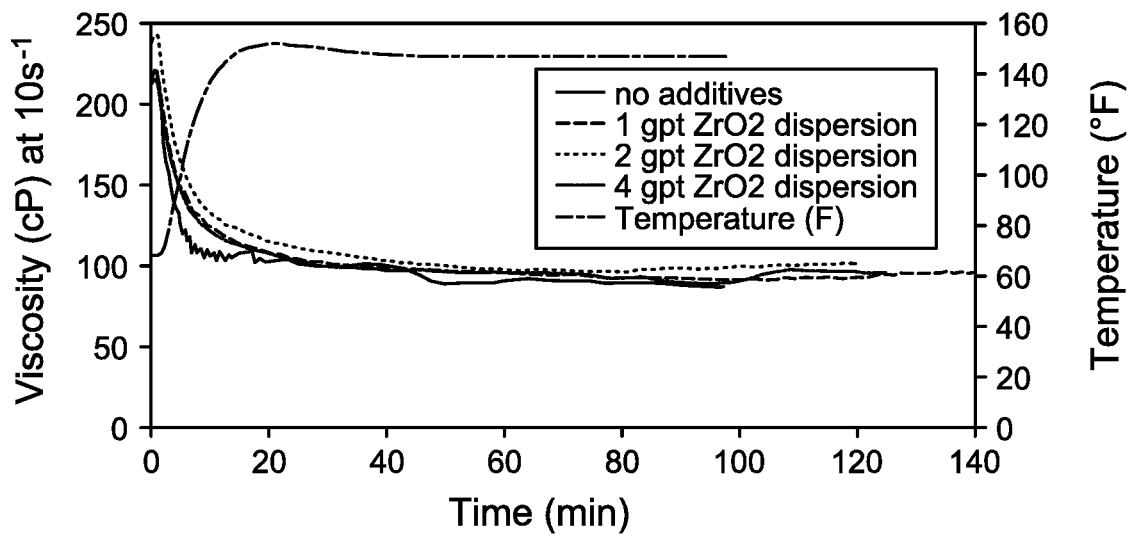
FIG. 8 shows a comparison of the viscosity curves of fluids with 30 pptg guar and $ZrO_2$ dispersion in the absence of a boron-containing crosslinker.

FIG. 8 shows a comparison of the viscosity curves for different fluids at pH 10 containing guar and $ZrO_2$ and in the absence of a boron-containing crosslinker. The figure shows that the fluid viscosity of the fluids with 30 pptg guar and $ZrO_2$ is about the same as the viscosity of a 30 pptg guar gel with no transition metal oxide additive or boron-containing crosslinker, that is no viscosity change is observed, suggesting minimal crosslinking between $ZrO_2$ and guar at pH 10.

Example 3. In Example 3, a number of fluids were created to test the viscosity of $TiO_2$ containing compositions. The fluids were tested in the pressure cell by maintaining the pressure at 500 psi for 60 minutes, then increasing the pressure to 2,500 psi for 10 minutes, then increasing the pressure to 5,000 psi for 10 minutes, and finally increasing the pressure to 8,000 psi for 20 minutes. Then the pressure was decreased to 5,000 psi for 10 minutes, then decreased to 2,500 psi for 10 minutes, and finally decreased to 500 psi for 10 minutes. In the fluid samples of Example 3, the polymer was guar, the boron-containing crosslinker was sodium borate, and the transition metal oxide additive was the $TiO_2$ nanoparticle dispersion. Table 5 shows the composition of the fluids of Example 3.

TABLE 5

Composition of fluid samples of Example 3 with $TiO_2$

| Fluid | Polymer Concentration | Boron-Containing Crosslinker Concentration | Transition Metal Oxide Additive ($TiO_2$) Concentration |
|---|---|---|---|
| 3A | 30 pptg | 1 gpt | 0% by weight |
| 3B | 30 pptg | 1 gpt | 0.015% by weight |
| 3C | 30 pptg | 1 gpt | 0.09% by weight |

Fluid 3A was a guar/borate crosslinked fluid prepared by hydrating guar in Houston, Tex. tap water to produce a 30 pptg guar gel, which was then crosslinked with 1 gpt PAXL-125L. PAXL-125L is a self-buffered borate crosslinker. The pH of Fluid 3A was around 10. The viscosity response of Fluid 3A was tested in the pressure cell at 10 s$^{-1}$ at 150 deg F. as outlined.

Fluid 3B was a pressure-tolerant dual-crosslinker gel prepared by hydrating guar in Houston, Tex. tap water to produce a 30 pptg guar gel, mixing the guar gel with 0.015% by weight of the $TiO_2$ nanoparticle dispersion, and then mixed with 1 gpt PAXL-125L. The pH of Fluid 3B was about 10. The viscosity response of Fluid 3B was tested in the pressure cell at 10 s$^{-1}$ at 150 deg F. as outlined.

Fluid 3C was a pressure-tolerant dual-crosslinker gel prepared by hydrating guar in Houston, Tex. tap water to produce a 30 pptg guar gel, mixing the guar gel with 0.09% by weight of the $TiO_2$ nanoparticle dispersion, and then mixed with 1 gpt PAXL-125L. The pH of Fluid 3C was about 10. The viscosity response of Fluid 3C was tested in the pressure cell at 10 s$^{-1}$ at 150 deg F. as outlined.

Figure 9:
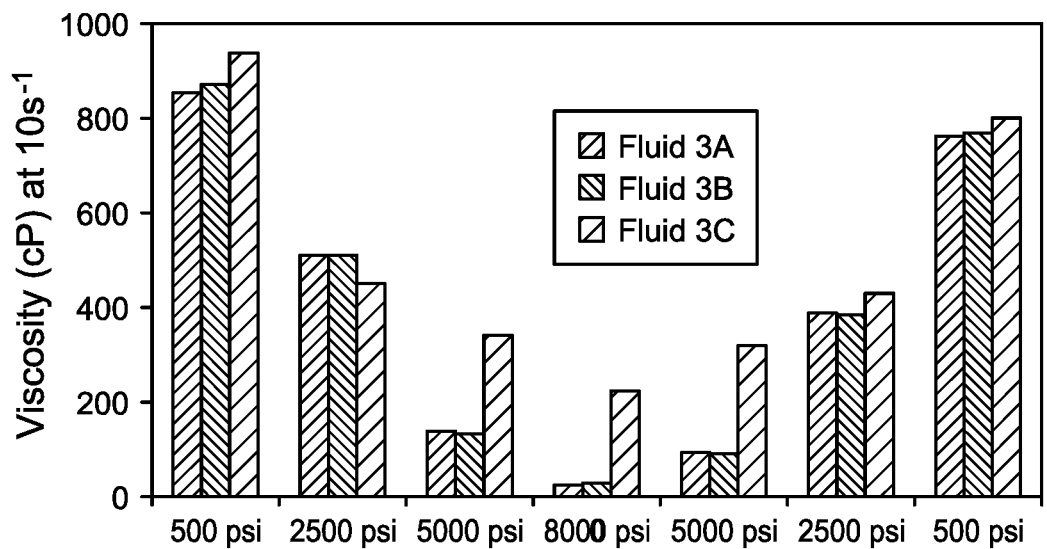
FIG. 9 shows a comparison of the viscosity response of Fluid 3A (no nanoparticles), Fluid 3B (with 0.02% by weight titanium oxide ($TiO_2$) dispersion), and Fluid 3C (with 0.12% by weight $TiO_2$ dispersion) of Example 3.

FIG. 9 shows a comparison of the viscosity response of Fluid 3A, Fluid 3B, and Fluid 3C of Example 3. As shown in FIG. 9, the addition of 0.02% by weight of the TiO$_2$ nanoparticle dispersion (Fluid 3B) exhibits little improvement over Fluid 3A without TiO$_2$ nanoparticle dispersion. With the addition of 0.12% by weight of the TiO$_2$ nanoparticle dispersion (Fluid 3C) the viscosity was 223 cP at 10 s$^{-1}$ under 8,000 psi, compared to 27 cP for Fluid 3A, which was an eight-fold increase over the viscosity of Fluid 3A at 8,000 psi as shown in Table 6.

TABLE 6

Data from viscosity tests for Fluid 3A, Fluid 3B, and Fluid 3C.

| | Viscosity (cP at 10 s$^{-1}$) | | |
|---|---|---|---|
| Pressure (psi) | Fluid 3A | Fluid 3B | Fluid 3C |
| 500 | 853 | 871 | 935 |
| 2500 | 514 | 513 | 450 |
| 5000 | 140 | 135 | 340 |
| 8000 | 27 | 29 | 223 |
| 5000 | 94 | 91 | 320 |
| 2500 | 388 | 382 | 427 |
| 500 | 764 | 770 | 800 |

Surprisingly, the Examples demonstrate that the impact on viscosity loss was not the same for each transition metal oxide additive.

Figure 10:
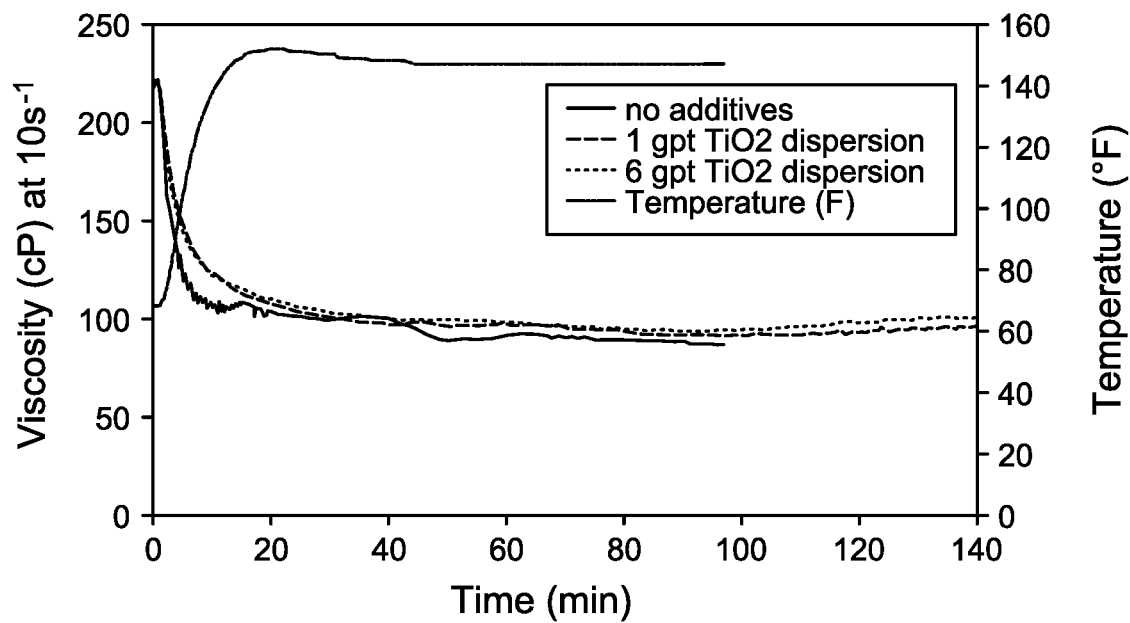
FIG. 10 shows a comparison of the viscosity curves of a fluid with 30 pptg guar and $TiO_2$ dispersion in the absence of a boron-containing crosslinker.

FIG. 10 shows a comparison of the viscosity curves for different fluids at pH 10 containing guar and TiO$_2$ and in the absence of a boron-containing crosslinker. The figure shows that the fluid viscosity of the fluids with 30 pptg guar and TiO$_2$ is about the same as the viscosity of a 30 pptg guar gel with no transition metal oxide additive or boron-containing crosslinker, that is no viscosity change is observed, suggesting minimal crosslinking between TiO$_2$ and guar at pH 10.

Although the embodiments here have been described in detail, it should be understood that various changes, substitutions, and alterations can be made hereupon without departing from the principle and scope of the embodiments. Accordingly, the scope should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the embodiments pertain, except when these references contradict the statements made here.

As used here and in the appended claims, the words "comprise," "has," and "include" and all grammatical variations of the same are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present embodiments.

That which is claimed is:

1. A method for preparing a pressure-tolerant fluid, the method comprising the steps of:
    adding a pressure-tolerant dual-crosslinker gel to a fracturing fluid, the pressure-tolerant dual-crosslinker gel comprises:
        a polymer, wherein the polymer comprises cis-hydroxyl groups,
        a boron-containing crosslinker, wherein the boron-containing crosslinker is selected from the group consisting of borate salts, boric acid, and combinations of the same, and
        a transition metal oxide additive, wherein the transition metal oxide is in the absence of a crosslinker appended to its surface, wherein the transition metal oxide additive is selected from the group consisting of transition metal oxide nanoparticles, transition metal oxide nanoparticle dispersions, polymeric material-stabilized transition metal oxides, transition metal oxide nanoparticles with other metal nanoparticles, and metal-organic polyhedra including transition metal oxides, wherein the transition metal oxide is operable to crosslink the cis-hydroxyl groups of the polymer at pressures greater than 2500 psi,
        wherein the boron-containing crosslinker and the transition metal oxide additive are separately operable to crosslink the polymer; and
    mixing the pressure-tolerant dual-crosslinker gel with the fracturing fluid to produce the pressure-tolerant fluid, wherein the pressure-tolerant dual-crosslinker gel is operable to viscosify the fracturing fluid, wherein the pressure-tolerant fluid has a viscosity of greater than 150 cP at 150 deg F. at a pressure of 8000 psi.

2. The method of claim 1, wherein the polymer is present in a concentration of between 12 pptg and 100 pptg.

3. The method of claim 1, wherein the polymer is selected from the group consisting of guar, guar-derivatives, polyvinyl alcohols, mannose, mannose-containing compounds, and combinations of the same.

4. The method of claim 1, wherein the boron-containing crosslinker is present at a concentration between 0.002% by weight and 2% by weight of the fracturing fluid.

5. The method of claim 1, wherein the boron-containing crosslinker comprises a borate salt selected from the group consisting of sodium borate, sodium pentaborate, sodium tetraborate, calcium borate, magnesium borate, and combinations of the same.

6. The method of claim 1, wherein the transition metal oxide additive is present at a concentration between 0.0002% by weight and 2% by weight of the fracturing fluid.

7. The method of claim 1, wherein the transition metal oxide additive comprises a transition metal oxide nanoparticle selected from the group consisting of zirconium oxide nanoparticles, titanium oxide nanoparticles, cerium oxide nanoparticles, and combinations of the same.

8. The method of claim 1, wherein the polymer comprises guar, the boron-containing crosslinker comprises sodium borate and the transition metal oxide additive comprises $CeO_2$ nanoparticles.

9. The method of claim 1, wherein a diameter of the transition metal oxide additive is in the range between 5 nm and 100 nm.

10. The method of claim 1, wherein the transition metal oxide additive comprises cerium oxide nanoparticles present at a concentration of 0.02% by weight of the fracturing fluid.

11. The method of claim 1, further comprising the step of adding a proppant to the pressure-tolerant fluid.

12. The method of claim 1, wherein the fracturing fluid is an aqueous based fracturing fluid.

13. A method for preparing a pressure-tolerant fluid for use in a well, the method comprising the steps of:
mixing a polymer and a boron-containing crosslinker in a fracturing fluid, wherein the polymer comprises cis-hydroxyl groups, wherein the boron-containing crosslinker is selected from the group consisting of borate salts, boric acid, and combinations of the same; and
adding a transition metal oxide additive at the well to produce the pressure-tolerant fluid, wherein the transition metal oxide is in the absence of a crosslinker appended to its surface, wherein the transition metal oxide additive is selected from the group consisting of transition metal oxide nanoparticles, transition metal oxide nanoparticle dispersions, polymeric material-stabilized transition metal oxides, transition metal oxide nanoparticles with other metal nanoparticles, and metal-organic polyhedra including transition metal oxides, wherein the transition metal oxide is operable to crosslink the cis-hydroxyl groups of the polymer at pressures greater than 2500 psi,
wherein the boron-containing crosslinker and the transition metal oxide additive are separately operable to crosslink the polymer,
wherein the pressure-tolerant fluid has a viscosity of greater than 150 cP at 150 deg F. at a pressure of 8000 psi.

14. The method of claim 1, wherein the polymer is present in a concentration of between 12 pptg and 100 pptg.

15. The method of claim 1, wherein the polymer is selected from the group consisting of guar, guar-derivatives, polyvinyl alcohols, mannose, mannose-containing compounds, and combinations of the same.

16. The method of claim 1, wherein the boron-containing crosslinker is present at a concentration between 0.002% by weight and 2% by weight of the fracturing fluid.

17. The method of claim 1, wherein the boron-containing crosslinker comprises a borate salt selected from the group consisting of sodium borate, sodium pentaborate, sodium tetraborate, calcium borate, magnesium borate, and combinations of the same.

18. The method of claim 1, wherein the transition metal oxide additive is present at a concentration between 0.0002% by weight and 2% by weight of the fracturing fluid.

19. The method of claim 1, wherein the transition metal oxide additive comprises a transition metal oxide nanoparticle selected from the group consisting of zirconium oxide nanoparticles, titanium oxide nanoparticles, cerium oxide nanoparticles, and combinations of the same.

20. The method of claim 1, wherein the transition metal oxide additive comprises cerium oxide nanoparticles present at a concentration of 0.02% by weight of the fracturing fluid.

* * * * *